Feb. 2, 1960 E. D. GLASS ET AL 2,923,356
PLUGGING WATER AND GAS ZONES OF WELLS
Filed July 1, 1957 2 Sheets-Sheet 1

*INVENTORS*
EUGENE D. GLASS
SYLVAIN J. PIRSON
BY

*ATTORNEY*

Feb. 2, 1960  E. D. GLASS ET AL  2,923,356
PLUGGING WATER AND GAS ZONES OF WELLS
Filed July 1, 1957  2 Sheets-Sheet 2
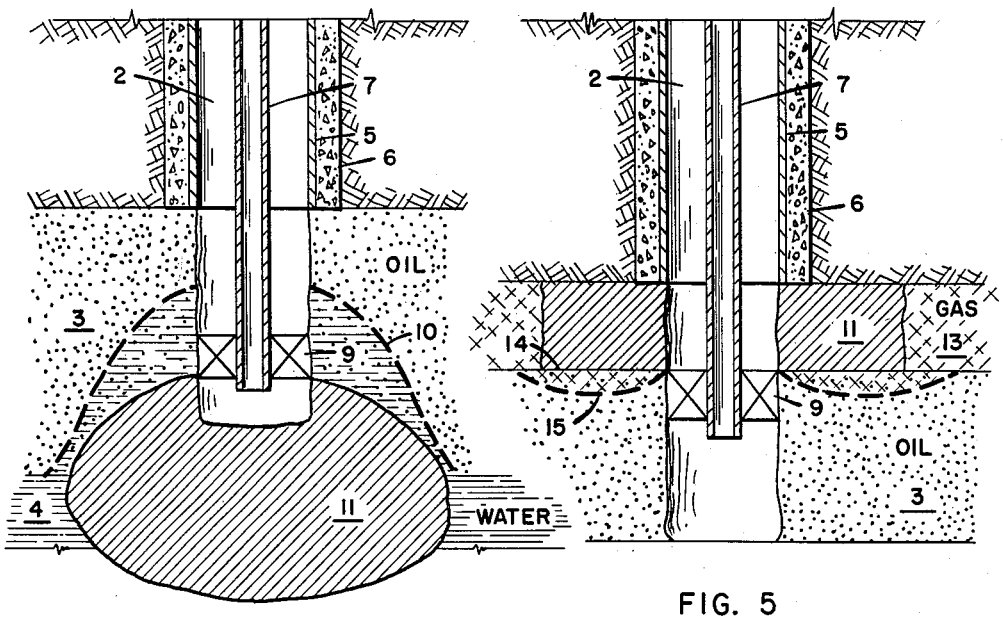
FIG. 4
FIG. 5
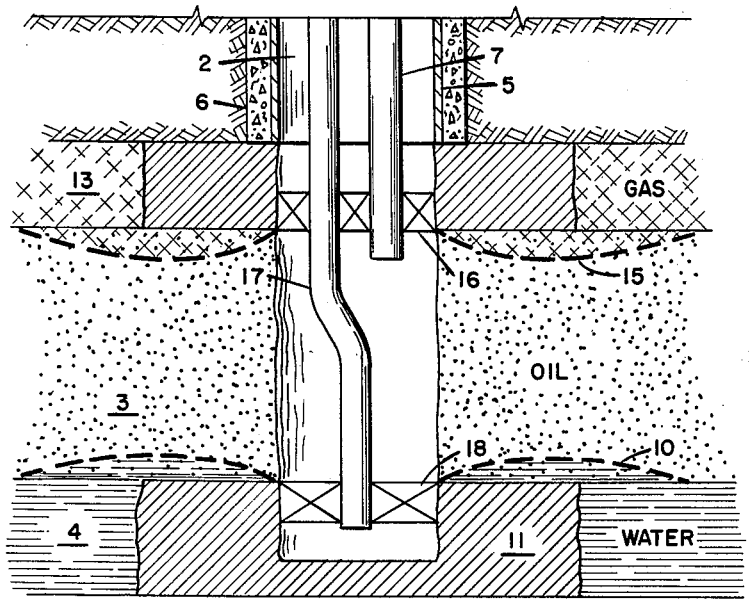
FIG. 6
INVENTORS
EUGENE D. GLASS
SYLVAIN J. PIRSON
BY
ATTORNEY

United States Patent Office 2,923,356
Patented Feb. 2, 1960

2,923,356

PLUGGING WATER AND GAS ZONES OF WELLS

Eugene D. Glass, Tulsa, Okla., and Sylvain J. Pirson, Austin, Tex., assignors to Pan American Petroleum Corporation, Tulsa, Okla., a corporation of Delaware Application July 1, 1957, Serial No. 668,984

3 Claims. (Cl. 166—45)

This invention relates to improving the productivity of oil and gas wells. More particularly, it relates to methods and equipment for decreasing water coning in oil and gas wells and decreasing gas coning in oil wells.

When a well penetrates an oil-bearing formation, oil can sometimes be produced from the formation substantially free from water or gas. Sometimes this is because no water zone is present below the oil-bearing zone and no free gas exists in a zone above the oil-bearing zone. Usually, however, water does underlie the oil and is in contact with the oil, or free gas lies over the oil and is in contact with the oil. Frequently, both water and free gas are present in zones in contact with the oil-bearing zone. In such cases water, gas, or both water and gas may be present in the produced oil. This is true even though casing is set through the gas-bearing zone and the well is not drilled into the water-bearing zone. In this arrangement the well is not directly exposed to either the gas-bearing zone or the water-bearing zone. Nevertheless, when oil is produced into the well, the pressure in the oil-bearing zone near the well drops to a value below the normal reservoir pressure. Thus, the pressure in the oil-bearing zone becomes lower than the pressures in the water-bearing zone and the gas-bearing zone. Flow of water and gas into the oil-bearing zone then occurs to cause cones of these fluids to exist in the oil-bearing zone. Water and gas may then be produced into the well with the oil.

Several problems arise when water coning and gas coning reach the stage where gas and water are produced with the oil. If a large volume of gas is produced, the expansion energy of the gas is lost and becomes unavailable to force the oil to flow out of the reservoir and into the well. Under many conservation laws wells which produce fluids having a high gas-to-oil ratio are severely penalized in allowable production rates in order to conserve the reservoir energy. In addition, many conservation laws require compressing and recycling of the gas to the reservoir, particularly if a ready market for the gas is not available. The expense of such compression and recycling can become prohibitive. Water production can also pose serious problems in lifting the water to the top of the well, separating it from the oil, and disposing of it.

While the above problems may cause difficulties, a more serious problem is the tendency of water and gas production to limit oil production. When water and gas cone into the oil zone and flow into the well through a portion of the oil zone exposed to the well, they occupy part of the volume through which oil formerly flowed to the well. This volume then becomes unavailable to the flow of oil so oil production is restricted. The bottom-hole pressure in the well may sometimes be decreased to increase the rate of flow of oil to the former value. As explained above, however greater rates of flow of oil can be caused only by lower pressures in the oil zone. These lower pressures also cause the water and oil cones to be extended farther into the oil zone. This further restricts the volume through which the oil can be produced into the well. It will be apparent that a water or gas cone can seriously limit the flow of oil to a well and thus greatly decrease the oil-producing ability of the well.

A closely related problem is the coning of water into a gas-bearing zone. Sometimes a reservoir contains little or no oil, so a water zone may be directly in contact with the gas zone. If gas is produced into a well penetrating such a formation, the water may cone up into the gas zone. The problem normally is not serious because of the low viscosity and density of the gas compared to water. Water coning into a gas zone can be a problem, however, if the gas producing rate is sufficient to draw the pressure in the gas zone down to a value far below that in the water zone.

With the above problems in mind, an object of this invention is to provide a method for preventing or decreasing the encroachment of a water or gas zone into the oil-bearing zone of an oil-producing formation, thereby leaving more channels available for flow of oil to the well and thus increasing the oil-producing capacity of the well. Another object of the invention is to provide a method for preventing the coning of water into gas-producing formations. Other objects will be apparent to those skilled in the art from the following description and examples.

In co-pending United States application Serial Number 668,985, filed on July 1, 1957, by Roy E. Campbell, a method is described for decreasing water and gas coning. In general, the Campbell method as applied to water coning into an oil zone, for example, calls for setting a packer below the top of the water cone and producing water from below the packer to reduce the level of the oil-water contact and thus expand the portion of the formation available for flow of oil into the well. A similar system is applicable for decreasing gas coning and thus raising the level of the gas-oil contact to exand the oil-producing zone. As explained in more detail in the Campbell application, the oil-producing ability of a well can be increased and the water-oil ratio can sometimes be decreased by this method. It will be noted, however, that the method calls for the deliberate production of water or gas from the well on one side of the packer while the oil is produced from the well on the other side. It would, of course, be desirable to decrease further the volume of water or gas which must be produced to reduce water or gas coning and increase oil production. We have now found that this can be done by forming a partial plug in at least the portion of the water-producing zone or gas-producing zone on the opposite side of the packer from the oil-producing zone.

Formation of a plug in the water-producing zone or gas-producing zone in contact with an oil-producing zone has been attempted in the past. The degree of success in shutting off water or gas in such cases depends upon the percent reduction in permeability which can be produced by the particular plugging method and the distance into the formation to which the plug can be extended. Considerable reduction in water production can be obtained by this method, but there is still some tendency for the water or gas to cone around the end of the plug and flow to the well through the oil zone. The coning is, of course, smaller than when the plug is not present. This is because the pressure in the oil-producing zone at the end of the plug remote from the well is much higher than the pressure at the well. Thus, there is less difference in pressure between the oil-producing zone and the water-producing zone to cause water coning. Nevertheless, some coning is unavoidable. The oil-producing zone is decreased to the extent to which the water and/or gas cones form.

In general, we have found that we can accomplish the objects of our invention by combining a limited form of the plugging technique with a variation of the Campbell method. Again, the oil-water system will be used as an example for convenience and simplicity. We propose to form only a partial plug in the water zone. A packer is then set so that oil can be produced into the well above the packer while water is produced through the partially plugged zone and into the well below the packer. We can thus obtain the advantages of both the plugging and Campbell techniques with few of the disadvantages of either.

Our invention will be better understood by reference to the various figures in the drawing in which.

Figure 4 demonstrates application of the method to a well in which the bottom does not penetrate the normal static water-bearing zone.

Figure 5 shows application of the invention to prevention of gas coning.

Figure 6 shows an application to an oil-producing formation in contact with both a water-bearing zone and a gas-bearing zone.

Before discussing the figures, however, the terms "water-producing zone," "oil-producing zone," and "gas-producing zone" should be carefully defined to clarify the description and definition of our invention. The term "water-producing zone" when used hereinafter means the portion of formation which is exposed to the well bore and through which water is produced to the well. In a producing well, the water-producing zone generally has no relation to the original natural water-bearing zone of the formation. The water-producing zone of a well around which a water cone exists includes the water cone since water is produced into the well through the volume of this cone. Similarly, the gas-producing zone should be considered to include all portions of the formation through which gas is produced into the well. This will, as in the case of the water-producing zone, include a portion of the original oil-bearing zone of the formation as it existed before production of fluids from the formation was initiated. The oil-producing zone of a well includes only that portion of the original oil-bearing zone of the formation through which oil can be produced to the well bore.

Figure 1:
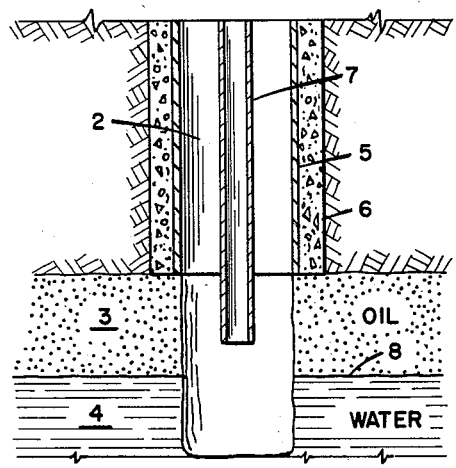
Figure 1 is a cross-sectional view of the bottom of a well under static conditions.

Turning now to the drawings, Figure 1 shows an oil-bearing zone 3 and a water-bearing zone 4 penetrated by a well 2. Casing 5 is set to the top of the oil zone and is sealed in the well by cement 6. Tubing 7 is run into the well to conduct well fluids to the top of the well. The oil-water contact 8 is shown in its natural position in the formation before production begins. When the well is produced, the position of contact 8 may change. In the well shown in Figure 1, however, there is no particular reason for change. Both oil and water are relatively incompressible fluids and flow radially to the well under substantially the same difference between reservoir pressure and pressure in the well. Therefore, the pressure in the water zone below the oil-water contact at any given distance from the well will be substantially the same as the pressure in the oil zone at the same distance from the well.

A numerical example will be helpful. Suppose wells in a field are on 10-acre spacing so a reservoir pressure $P_r$ can be considered to exist at a distance of about 400 feet from a well. A pressure $P_w$ is maintained in the bottom of the well. The well is 6 inches in diameter. In this case the pressure difference can be represented by the following formula:

$$P_r - P_w = \frac{QZ \log L/r}{KTD} \quad (1)$$

where $Q$ = quantity of liquid flowing
$Z$ = viscosity of liquid
$L$ = distance from center of well to point where pressure $= P_r$
$r$ = radius of well
$K$ = constant
$T$ = thickness of formation exposed to well
$D$ = permeability of the formation The difference between the well pressure $P_w$ and the pressure $P_d$ at any distance $d$ from the well may be stated as follows:

$$P_d - P_w = \frac{QZ \log d/r}{KTD} \quad (2)$$

Dividing (2) by (1)

$$\frac{P_d - P_w}{P_r - P_w} = \frac{\log d/r}{\log L/r}$$

If $L$ is 400 feet, $r$ is ¼ foot, $d$ is 10 feet.

$$\frac{P_d - P_w}{P_r - P_w} = \frac{\log 10/\frac{1}{4}}{\log 400/\frac{1}{4}} = \frac{\log 40}{\log 1600} = \frac{1.602}{3.204} = \frac{1}{2}$$

This shows that under the conditions stated ½ the pressure drop from reservoir to well pressure occurs within 10 feet of the well. Thus, if reservoir pressure is 600 pounds per square inch and the well pressure is held at 400 pounds per square inch, the pressure 10 feet back in the formation from the well will be 500 pounds per square inch in both the water and oil zones.

If the water zone is completely plugged to a distance of 10 feet from the well, no flow can occur through the water zone so the pressure in the water zone immediately behind the plug will be near the reservoir pressure, or 600 pounds per square inch. Due to the flow in the oil zone, however, it has been shown above that the pressure 10 feet from the well will be only 500 pounds per square inch. Therefore, a pressure difference of 100 pounds per square inch is available to cause water to flow up into the oil zone behind the plug. Once in the oil zone, the water flows through this zone to the well. We have now found that, by only partially plugging a portion of the water zone, setting a packer between the plugged and unplugged portions of the formation, and decreasing the pressure below the packer to a value less than the pressure above the packer, the water-to-oil ratio can be decreased.

Figure 2:
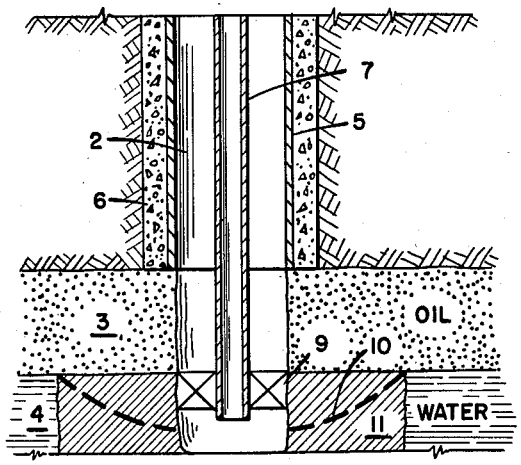
Figure 2 shows an embodiment of the invention in which a partial plug has been formed in the water zone and the oil has been caused to cone down into this zone.

Suppose, for example, in Figure 2 that the conditions are the same as in the example described in connection with Figure 1 except that the water zone 4 has been plugged to a distance of 10 feet from the well by plugging agent 11 which may be naphthalene, for example. The plugging is not complete. The formation permeability to water has been decreased from 300 millidarcys to 100 millidarcys in the partially plugged zone. The pressure in the water zone beyond the plug under these conditions can be calculated as follows:

$$P_d - P_w = \frac{QZ \log d/r}{KTD_d}$$

= pressure drop through partial plug $$P_r - P_d = \frac{QZ \log L/d}{KTD_r}$$

= pressure drop through unplugged portion of water zone where $D_d$ = Permeability of plugged zone within distance $d$ of the well.

$D_r$=Permeability of the unplugged reservoir formations $$\frac{P_d - P_w}{P_r - P_d} = \frac{D_r \log d/r}{D_d \log L/d}$$

If $D_r$=300 millidarcys, $D_d$=100 millidarcys, $d$=10 feet, $L$=400 feet, $r$=¼ foot.

$$\frac{P_d - P_w}{P_r - P_d} = \frac{300 \log 10/\frac{1}{4}}{100 \log 400/10} = \frac{3 \log 40}{\log 40} = 3$$

That is, the pressure drop through the plugged zone is three times the drop through the unplugged portion, or ¾ of the pressure drop occurs through the plugged portion. This means that, if the reservoir pressure is 600 pounds per square inch and the well pressure is 400 pounds per square inch, the pressure in the water zone just beyond the end of the plug tends to be 550 pounds per square inch. This is still higher than the pressure in the oil zone, so coning still occurs.

What we propose, however, is to set packer 9 in the well so the well above the packer can be maintained at one pressure while the well below the packer can be maintained at a lower pressure. The pressures above and below the packer in the well extend out into the formation. The lower pressure in the partially plugged water zone below the level of the packer produces a vertical flow downward into this zone from the higher pressure oil zone above the level of the packer. Thus, the water in the oil zone above the level of the packer flows downwardly as well as radially to the well. The ratio of downward to radial flow depends in part, of course, on the magnitude of the difference between the pressures in the formation above and below the level of the packer. The pressure in the well below the packer could, at least theoretically, be reduced sufficiently to cause not only water but also oil to flow into the well below the packer. This extreme situation is shown in Figure 2 where the new oil-water contact 10 has not only been pulled down out of the oil zone but has been caused to move into the water zone. An oil cone thus exists in the water zone, increasing the flow of oil and decreasing the flow of water. Due to the partially plugged nature of the water zone, the volume of water has been greatly decreased below the amount necessary to perform the same function in the Campbell method mentioned previously.

Figure 3:
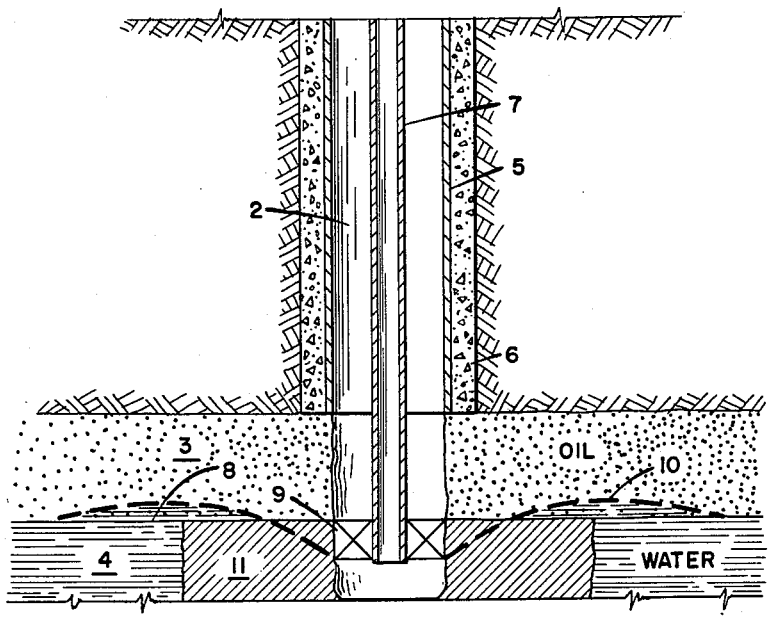
Figure 3 is similar to Figure 2 except that different operating conditions are employed.

The water cone need not be removed entirely from the oil cone. The water can be permitted to flow up into the oil zone behind the partially plugged water zone. This water can then be pulled back down out of the oil zone near the well. The result will be somewhat as shown in Figure 3. In this figure, the arrangement of the tubing packer and plugged water zone is the same as in Figure 2. The operation has been changed, however, by decreasing the pressure difference between zones above and below the packer to cause the oil-water contact 10 to rise into the oil zone in the portion of the formation beyond the partial plug in the water zone. The pressure below the packer is low enough, however, to cause the oil-water contact near the well to drop back to about the level of the packer. In this way, the oil zone above the packer is kept clear of water in the region of high velocity flow near the well. Thus, the rate of water production is greatly decreased by the partial plug and slight oil cone in the water zone without seriously affecting the oil-producing rate. The oil can be removed from above the packer by flow through the open annular space around tubing string 7, or a second tubing string (not shown) can be run to aid in removing oil through this annular space.

If a packer only 2 or 3 feet long is used, only a small difference can be established between the pressures above and below the packer. This is because a large pressure difference is quickly relieved by vertical flow of liquids through the formation. In a way this is desirable since it is apparent that only small pressure differences will be required to cause the water to flow vertically out of the oil zone and back into the water zone near the well. In another way, however, large vertical flows near the well are undesirable since they increase the difficulty of extending pressure differences to considerable distances from the well. Thus, only the oil zone near the well may be relieved of the water cone. If the packer is made longer, greater pressure differences can be established between zones above and below the packer. Lower pressures can thus be maintained at points in the water zone farther out away from the well. These lower pressures will, in turn, cause removal of the water cone from the oil zone at greater distances from the well. If desired, a metal liner can be set and cemented in the well opposite the oil and water zones. The liner can then be perforated near the top of the oil zone and near the bottom of the water zone. The effects of a very long packer can thus be obtained by setting a short packer inside the liner.

It should be noted at this point that the partial plug in the water zone serves a dual function. It not only decreases the rate at which water flows radially through this zone to the well, it also decreases the rate at which water flows vertically through the zone near the well. This makes possible developing much greater pressure differences between zones above and below the level of the packer than would otherwise be possible. As noted above, this makes possible maintaining pressure differences between the oil and water zones at greater distances from the well with the result that the water cone is removed from a larger portion of the oil zone.

It will be apparent that by placing a packer on tubing near the top of the plugged water-producing zone and decreasing the pressure in the well below the packer to a value less than the pressure in the well above the packer, an improvement can be produced over the effects of simple plugging operations used in the prior art. It will also be apparent that by forming a partial plug in at least a portion of the water-producing zone in the aforementioned Campbell process, the advantages of that method can be obtained with a decreased water production rate.

For simplicity and convenience, a purely cylindrical flow system has been considered to this point. Our method is also applicable to wells which penetrate the water zone only partially or not at all. In either case, water flows upwardly through a distorted hemispherical flow system to establish an oil-water contact like that shown in Figure 4. In this figure, well 2 has been drilled into oil zone 3, but has not penetrated water zone 4. Nevertheless, a water cone has formed and has established an oil-water contact 10 as shown. In this case packer 9 on tubing 7 has been set below contact 10, the top of the water-producing zone in the well, and plugging agent 11 has been injected into the well below the packer and has been forced into the formation as shown. The agent is selected to produce only a partial plug extending into the formation for a distance af about 10 feet from the well. Oil is preferably pumped into the well above the packer during the injection of the plugging agent below the packer to maintain the pressures above and below the packer approximately equal. This is to prevent flow of the plugging agent into the formation above the level of the packer. After the partial plug has been formed, oil is produced from the well above the packer and water is produced from the well below the packer. The pressure below the packer is maintained at a value less than the pressure above the packer to cause a vertical flow near the well in a downward direction. This, of course, pulls the oil-water contact 10 down to a level near that of the packer. The oil-producing zone is thus increased with a corresponding increase in oil productivity. The water-producing rate of the well is decreased, however, due to the partially plugged nature of the water zone and its decreased size.

Our invention is not applicable to cases where the oil-producing zone is not in contact with the water-producing zone. Many examples of this kind occur where impervious layers of material, such as shales, separate the zones. Sometimes a plurality of oil-producing zones and water-producing zones are exposed to a single well bore, each being separated from the others by impermeable beds. Some water-producing zones may be above some oil-producing zones and give the appearance of water coning. The failure of our method to decrease the water-to-oil ratio of fluids produced from the well may indicate that this interbedding of oil and water zones exists. It may also indicate a poor casing cement job so that water is leaking into the well from behind the casing. Another possibility is that a good seal has not been made by the packer against the formation. It is generally best in case the method fails, therefore, to reseat the packer at a slightly different level in the well to be sure the difficulty is not a leaky packer.

The term "packer" has been used herein and will be used hereinafter to indicate any type of separating element for dividing the well bore into two sections. This element may be any of the more common forms of inflatable or mechanically settable packers or may consist of a settable fluid mass such as a phenol-formaldehyde resin, Portland cement, or the like. Many variations will occur to those skilled in the art. If desired, an ordinary packer of neoprene, canvas, rope, or the like may be used in combination with a liquid, preferably viscous, which may contain finely divided solids to aid in perfecting a seal against the formation. Again, many other variations of such combinations will occur to those skilled in the art. To facilitate making a good seal, a liner may be cemented to the bottom of the well. This liner may then be perforated at desired levels. Finally, the packer can be set inside the liner between groups of perforations where a good seal can be made against the smooth inside surface of the pipe.

As previously noted, water coning above a packer can be substantially reduced by decreasing the pressure below the packer to a value no greater than the pressure above the packer. As a practical matter, it is somewhat difficult to determine these pressures. Bottom-hole pressure gauges may be run separately through the tubing and the annular space between tubing and casing, but these must be very accurate and sensitive to detect small differences between the pressures above and below the packer. Another method is to place a differential pressure gauge in the packer. For example, such a gauge may be a diaphragm or bellows exposed on one side to pressure above the packer and on the other side to pressure below the packer. A lower pressure below the packer may cause the diaphragm or bellows to move to close electrical contacts or otherwise actuate signaling means to indicate at the top of the well that the pressure below the packer is no more than the pressure above the packer.

A more practical method of determining whether water production from below the packer is sufficient to decrease water coning is to measure the rate of production of oil above the packer and the water-to-oil ratio of fluids produced above the packer. If the rate of oil production increases or the water-to-oil ratio of fluids produced above the packer decreases, then the water cone is being reduced. Theoretically, it might seem that when the oil-water contact reaches the level of the packer, no further water should be produced above the packer. Actually, this is not true since the oil-water contact in a formation is not a sharp interface, but is a transition zone due to the capillary action of the formation. Because of capillary forces, some water always rises into the oil zone to provide an intermediate zone containing the irreducible minimum amount of oil at the bottom and the irreducible minimum amount of water at the top. A little water is produced with oil from the top of this transition zone, while mostly water and a little oil is produced from the bottom of this zone. Water-free oil can be produced only by pulling the top of the transition zone down to the level of the packer. This can be done if desired, but only at the cost of producing a larger amount of water and producing some oil with the water from below the packer. The best method of operation will have to be determined for each well, depending upon the circumstances of that particular well.

To this point our method has been considered principally from the standpoint of water coning in oil wells. The same general principles apply to gas coning in oil wells. Figure 5 shows such an application. In this figure well 2 is drilled through a gas zone 13 and into oil zone 3. Casing 5 is set at the top of the gas zone and sealed in place by cement 6. Packer 9 is run on tubing 7 and is set near the normal gas-oil interface 14. A suitable plugging agent 11, such as naphthalene, is then injected above the packer to form a partial plug in the gas zone to a distance of about 10 feet from the well. Oil should be injected below packer 9 during displacement of the plugging agent into the gas zone to prevent penetration of the plugging agent into the oil zone. For this purpose the pressure in the well below the packer should be slightly higher than the pressure above the packer.

After the partial plug has been formed, gas is produced from the well above the packer and oil is produced from the well below the packer. If desired, the gas may be produced through the partially plugged section at a rate sufficient to prevent any coning of gas into the oil zone. Coning of oil into the gas zone can even be produced. In order to avoid the production of large volumes of gas, however, it is generally best to maintain a pressure above the packer only slightly less than the pressure below the packer. This, of course, permits the gas to cone down into the oil zone past the end of the plug. A gas-oil contact 15 forms approximately as shown. Due to the lower pressure above the packer than below the packer in the well, however, gas-oil contact 15 bends back up toward the gas zone near the well. This will substantially decrease the gas cone in the region of high velocity flow in the oil zone near the well. At the same time, the partial plug in the gas zone greatly restricts the amount of gas which must be produced to maintain a lower pressure in the gas zone than in the oil zone near the well.

Figure 6 shows the application of our invention to a situation in which a water-bearing zone 4 and a gas-bearing zone 13 are both in contact with an oil-bearing zone 3. In Figure 6 well 2 has been drilled through the gas and oil zones and into the top of the water-bearing zone. Casing 5 is set at the top of the gas zone and is sealed in place by cement 6. A special packer 16 is run on the end of tubing string 7. This packer accommodates a second string of tubing 17. Packer 18 is run on the bottom of this second tubing string. This arrangement is common in multiple completion of wells. Similar systems are described, for example, in The Oil and Gas Journal, July 16, 1956, page 100, and October 1, 1956, page 78. After packers 16 and 18 are set, plugging solution 11 is injected above packer 16 and below packer 18 while oil is injected between the packers to keep the plugging solution out of the oil zone.

After the gas and water zones are partially plugged, gas is produced from above packer 16 at a rate sufficient to maintain a pressure above the packer at a value less than the pressure below the packer. This decreases the tendency to form a gas cone. Water is produced from below packer 18 at a rate sufficient to maintain a pressure below the packer at a value less than the pressure above the packer. This decreases the tendency to form a water cone. Oil is then produced from between packers 16 and 18. Preferably the gas-oil contact is maintained at about the level of packer 16, and the oil-water contact is maintained at about the level of packer 18. Both the oil-water and gas-oil contacts may be adjusted, however, according to the performance desired for the particular well.

It will be apparent that our method is also applicable to preventing or decreasing the formation of water cones into gas-producing zones of gas wells. In this case a packer is set near the normal gas-water contact in the formation, if the well penetrates the water zone, or near the bottom of the well, if the well does not penetrate the water zone. A plugging agent is then injected below the packer to form a partial plug in the water-producing zone of the well. Sufficient water is then produced from below the packer to prevent excessive water production above the packer.

Many methods are available in the prior art for forming the partial plug required in our process. If a water zone in contact with an oil zone is to be partially plugged, an operable method is described in 2,032,826, Ambrose et al. In this method a saturated solution of a plugging agent, such as naphthalene, in a solvent, such as methanol, can be injected into the water zone. The water dilutes the alcohol solution, precipitating at least a portion of the naphthalene. This method is capable of producing a little more than 50 percent reduction in permeability of the water zone. In order to accomplish a substantial decrease in water or gas production, the degree of plugging of these zones should be at least about 50 percent. To insure adequate flow of water or gas back into the water or gas zone near the well, the degree of plugging should not greatly exceed about 90 percent. Preferably, the degree of plugging should be about 70 to 80 percent.

A controlled degree of plugging can be obtained by the methods described and claimed in 2,779,415, Howard, and 2,779,416, Clark. In the Howard process a hot solution of a plugging agent, such as naphthalene, is injected into a water or gas zone. The solution cools to precipitate the plugging agent. The amount of plugging can be controlled by the amount of plugging agent dissolved in the hot solution. In the Clark process an emulsion of molten plugging agent such as naphthalene is injected into the zone to be plugged. The plugging agent freeze to produce the desired plugging while the emulsifying liquid, usually water, provides the desired degree of permeability. The degree of plugging is controlled by the ratio of molten plugging agent to emulsifying liquid.

Other plugging methods such as those described in 2,272,673, Kennedy; 2,348,484, Lawton; and the like may also be used. Still others will occur to those skilled in the art. Our invention does not depend upon the method of plugging employed except that the plug should be in the gas or water zone and should be only partial. This partial plugging is then combined with the setting of a packer and production of oil from the well on one side of the packer at a pressure higher than that at which gas or water is produced from the well on the other side of the packer.

Our method is capable of many variations. For example, the packers need not be set before the plugging operation in many cases. Oil need not necessarily be injected into the oil zone while plugging material is being injected into water and gas zones. This is particularly true if oil-soluble plugging agents, such as naphthalene, paraffin, or the like are used. The plug may extend into the formation to any distance considered economical. The degree of plugging may be selected within the specified limits to produce the desired results. After the plug has been formed and the packer has been set, production rates from both sides of the packer can be controlled to adjust the oil-water or gas-oil contact to the desired level. This need not be the level of the packer, although this is usually the case. Still other variations will be apparent to those skilled in the art.

We claim:

1. An improved method of producing a desired fluid from a well penetrating a formation in which a zone producing said desired fluid is in contact with a zone producing an undesired fluid, comprising forming a partial plug in at least a portion of the zone producing said undesired fluid, setting a packer in said well to divide said well into two sections, one section being above said packer and the upper section being below said packer, said packer being set at a level such that a first section of the well is exposed to at least a portion of the zone producing said desired fluid and a portion of the zone producing said undesired fluid, while a second section of the well is exposed to a portion of said zone producing said undesired fluid, producing desired fluid from said first section of the well, and producing undesired fluid from said second section of the well at a rate sufficient to decrease the pressure in said second section to a value no greater than the pressure in said first section of the well.

2. An improved method for producing oil from a well penetrating an oil-bearing formation in which a water-producing zone is in contact with an oil-producing zone, comprising forming a partial plug in at least a portion of said water-producing zone, setting a packer in the well on a tubing string, said packer being set below the top of said water-producing zone, producing oil from above said packer and producing water from below said packer at a rate sufficient to decrease the pressure below said packer to a value no greater than the pressure above said packer.

3. An improved method for producing oil from a well penetrating an oil-bearing formation in which a gas-producing zone is in contact with an oil-producing zone, comprising forming a partial plug in at least a portion of said gas-producing zone, setting a packer in the well on a tubing string, said packer being set above the bottom of said gas-producing zone, producing oil from below said packer and producing gas from above said packer at a rate sufficient to decrease the pressure above said packer to a value no greater than the pressure below said packer.

References Cited in the file of this patent

UNITED STATES PATENTS

| | | |
|---|---|---|
| 1,644,748 | Schweiger | Oct. 11, 1927 |
| 2,523,091 | Bruce | Sept. 19, 1950 |
| 2,749,988 | West | June 12, 1956 |